United States Patent [19]
Suzuki et al.

[11] 4,422,729
[45] * Dec. 27, 1983

[54] ELECTRO-OPTICAL DIAPHRAGM WITH RADIAL ELECTRODES

[75] Inventors: Ryoichi Suzuki, Kawasaki; Takashi Uchiyama, Yokohama, both of Japan

[73] Assignee: Canon Kabushiki Kaisha, Tokyo, Japan

[ * ] Notice: The portion of the term of this patent subsequent to Jun. 8, 1999, has been disclaimed.

[21] Appl. No.: 165,149

[22] Filed: Jul. 1, 1980

[30] Foreign Application Priority Data

Jul. 4, 1979 [JP] Japan ................... 54-84848

[51] Int. Cl.³ ............ G02F 1/13; G02F 1/133; G02F 1/03; G03B 9/08
[52] U.S. Cl. ................... 350/336; 350/392; 350/356; 354/271 (.1)
[58] Field of Search ............ 350/330, 334, 336, 357, 350/356, 355, 362, 363, 448, 449, 392; 354/227, 271

[56] References Cited

U.S. PATENT DOCUMENTS

| | | | |
|---|---|---|---|
| 3,955,208 | 5/1976 | Wick et al. | 350/336 X |
| 3,987,617 | 10/1976 | Slob | 350/336 X |
| 4,068,927 | 1/1976 | White | 350/362 |
| 4,153,344 | 5/1979 | Hamada et al. | 350/336 X |
| 4,222,641 | 9/1980 | Stolov | 350/331 R X |
| 4,313,663 | 2/1982 | Stemme et al. | 354/227 X |
| 4,326,776 | 4/1982 | Banda | 350/334 X |
| 4,333,720 | 6/1982 | Suzuki et al. | 354/227 |

FOREIGN PATENT DOCUMENTS

2949561 12/1979 Fed. Rep. of Germany ...... 350/334

*Primary Examiner*—John K. Corbin
*Assistant Examiner*—David Lewis
*Attorney, Agent, or Firm*—Toren, McGeady and Stanger

[57] ABSTRACT

In the disclosed solid-state diaphragm device, a liquid crystal cell is driven by a matrix driving system. Electrodes of a set on one plate of the cell are arranged in concentric circular relation to each other, while electrodes of another set on the other plate are arranged in radial relation. Related ones of the latter electrodes are connected with one another at their outer or inner peripheral portions to the matrix driving system.

2 Claims, 11 Drawing Figures

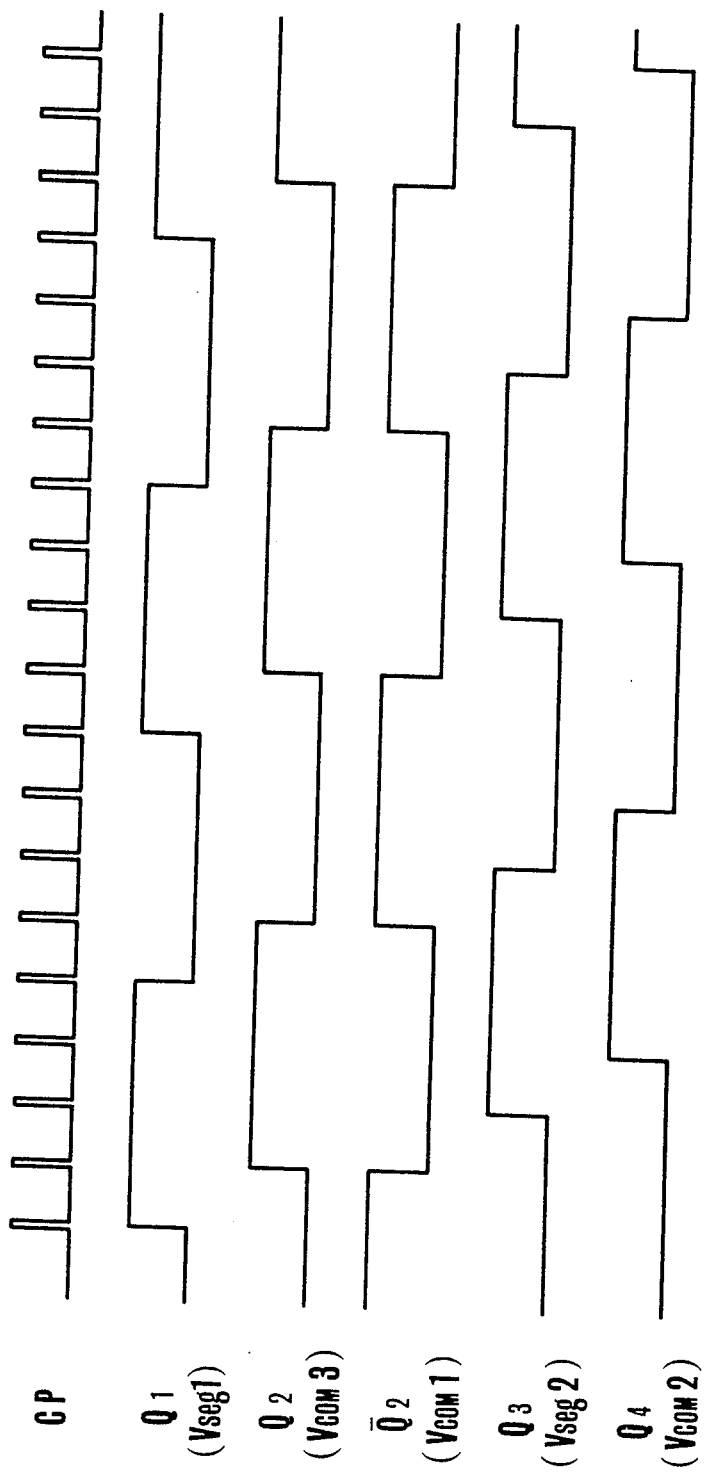

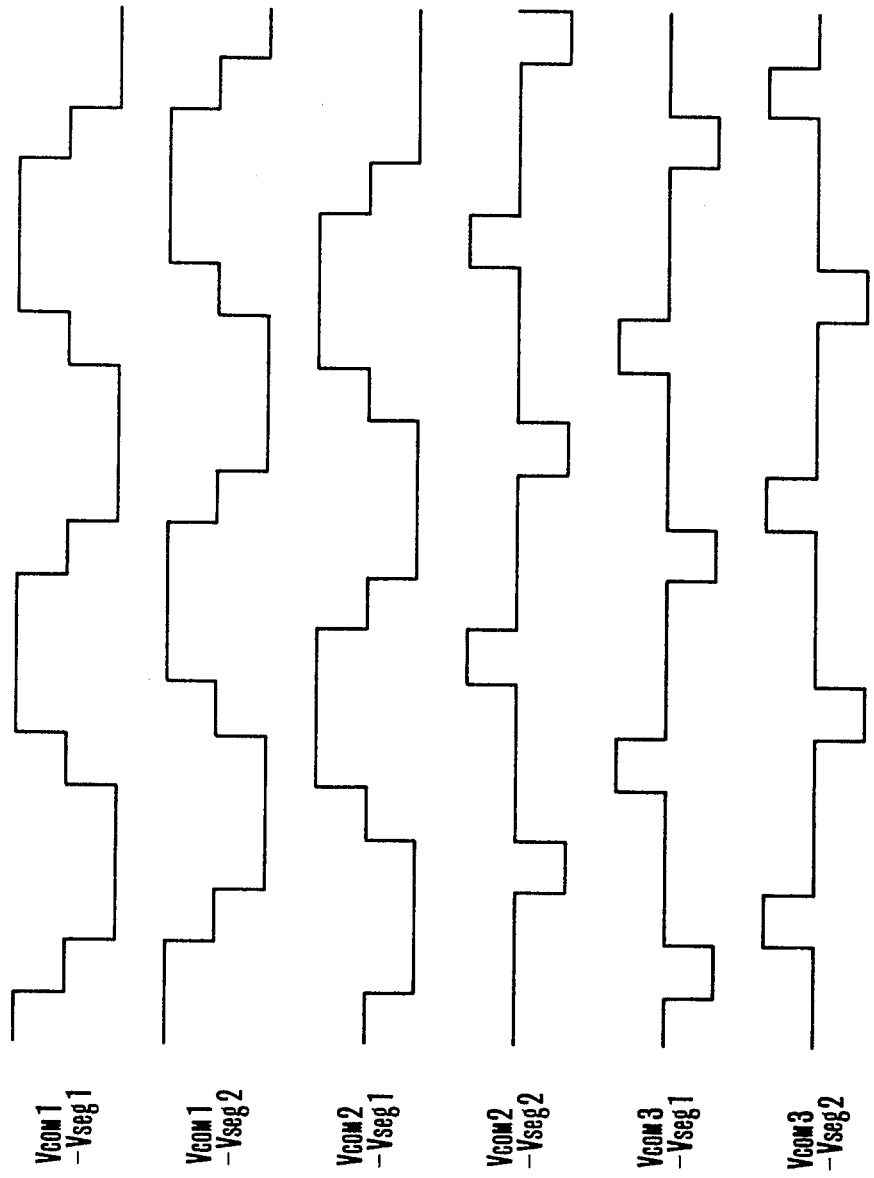

(a) (b)

ELECTRO-OPTICAL DIAPHRAGM WITH RADIAL ELECTRODES

BACKGROUND OF THE INVENTION

1. Field of the Invention

This invention relates to diaphragm devices for cameras using electric or magnetic optical elements whose transmittance is changed by applying an electrical field or magnetic field, or so-called solid-state diaphragm devices, and more particularly to an electrode arrangement of the liquid crystal cell in the solid-state diaphragm device. 2. Description of the Prior Art Diaphragm devices for cameras have, in the past, been mainly mechanical. However, a mechanical diaphragm necessitates a control mechanism therefor, and in the case of cameras using interchangeable lenses, there is also a need for a complicated translation mechanism between the diaphragm mechanism in the interchangeable lens mounting and the control mechanism in the camera body. This raises the cost of the camera, the bulk and size, limits the degree of design freedom, and causes other disadvantages.

With this in mind, proposals have been made to use an electrical or magnetic optical element of which the light transmittance is changed by applying an electrical field or magnetic field as the diaphragm in the camera and to provide a variety of so-called solid-state diaphragms. The above-described electrical or magnetic optical element may be in the form of a Kerr cell, transparent ferroelectric material (PLZT), liquid crystal, or Faraday element in combination with polarizers or analyzers. Elements utilizing electrophoresis or electrochromy have also been suggested.

These solid-state diaphragms have many characteristic features which the conventional mechanical diaphragms lack. First of all, no mechanical transmission mechanism is necessary, thus facilitating a minimization of the size and weight. This leads to a significant increase in the degree of freedom in camera construction. Because the diaphragm operates without shock and silently, an unpleasant impression is not given to the operator. Again, the provision of one switch is sufficient to control the closing down of the diaphragm once the depth of field is recognized. Also, what is necessary for the solid-state diaphragm to function is an electrical circuit, and this matches the recent trend of increasing the use of electronic elements in cameras, and can constitute a great step towards the achievement of a completely electronized camera in the future.

However, a solid-state diaphragm device using a liquid crystal cell has the following drawbacks.

In an area control type solid-state diaphragm device, when the precision of aperture control is made, for example, ⅓ stop in the Apex system, the provision of a 7-stop range of variation of the aperture size requires the selection of 3×7=21 different aperture values. On condition that the drive is static, therefore, almost the same number of electrodes must be employed in the liquid crystal cell. Further since, in single lens reflex cameras, the precision of aperture control is increased to ⅛ unit. When this is realized in a solid-state diaphragm device, whose aperture varies in 7 stops, it is necessary to establish 8×7=56 distinctly different aperture values. Therefore, an even greater number of electrodes must be employed. In practice, however, it is very difficult to carry out the assembly of so great a number of electrodes in connection with a drive circuit therefor.

On the other hand, the use of a matrix driving system makes it possible to reduce this number of electrodes. But note that the mere substitution of this matrix driving system for the driving system does not suffice to actually solve the problem. In more detail, where the multiplicity of electrodes to be driven by the matrix driving system are configured to annular shapes of different area and arranged in concentric relation to each other, the power source lines connecting the respective individual electrodes in the multiplicity to external electrical circuitry must be provided beneath the other transparent annular electrodes positioned outwardly of themselves. Thus, there is a need to employ a great number of strips of an electrically insulating layer between the electrodes and the lines. Moreover, this gives rise to an alternative problem which makes the structure of the liquid cell very complicated.

SUMMARY OF THE INVENTION

An object of the present invention is to provide a solid-state diaphragm device which limits the number of power source lines to a minimum and which is easy to manufacture.

Another object of the invention is to provide a solid-state diaphragm device with the limitation of the number of power source lines and of simple structure.

Still another object of the invention is to provide a solid-state diaphragm device of simple structure with high accuracy of aperture control.

These and other objects of the invention will become apparent from the following detailed description of embodiments thereof taken in conjunction with the accompanying drawings in which:

BRIEF DESCRIPTION OF THE DRAWINGS

FIG. 1(*b*) is a sectional view taken along line A—A' of FIG. 1(*a*).

FIG. 2(*b*) is a sectional view taken along line B—B' of FIG. 2(*a*).

FIGS. 3(*b*) and 3(*c*) are timing charts of waveforms occuring at the various portions of the circuit of FIG. 3(*a*).

DESCRIPTION OF THE PREFERRED EMBODIMENTS

Figure 1A:
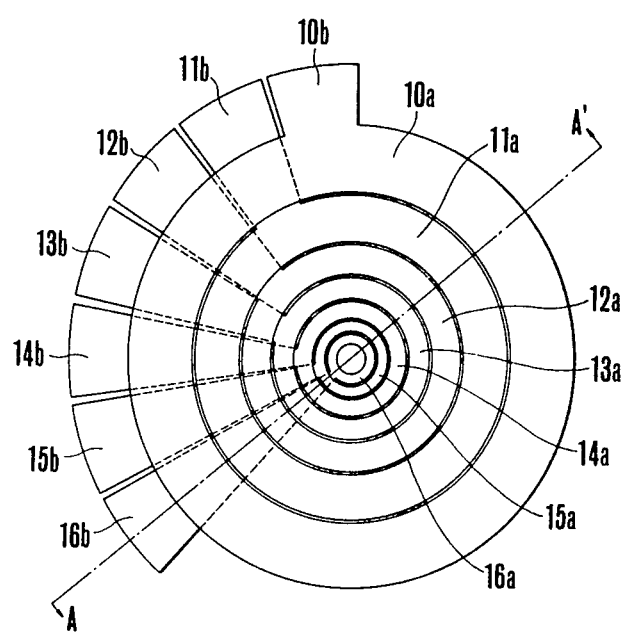
FIG. 1(*a*) is a plan view of an example of the construction and arrangement of a set of electrodes on a first transparent plate of a solid-state diaphragm device employing one form of the present invention.

In FIG. 1(a), a first set of mutually-insulated transparent electrodes 11a-16a is formed on the plate 20 of a pair of opposing transparent plates 20 and 30. (See FIG. 2a). The plates 20 and 30 form part of a liquid crystal cell of the solid-state diaphragm device of the invention and the liquid crystal is located between them. Electrically conducting strips 10b-16b provide power or energy to the electrodes 10a-16a and are electrically insulated from the electrodes 10a-16a by an insulating layer 21 of FIG. 1(b).

Figure 1B:
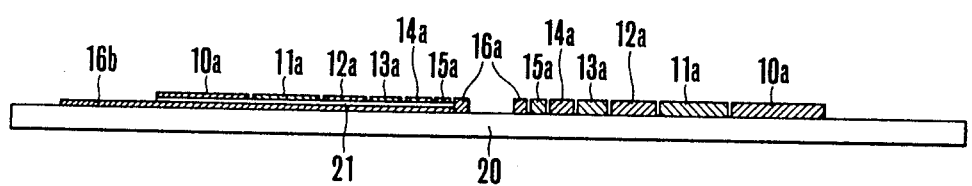

FIG. 1(b) shows the transparent plate 20 of the solid-state diaphragm device and a transparent insulating layer 21 between the annular electrodes 10a-15a and the above-described conducting strip 16b.

Figure 2A:
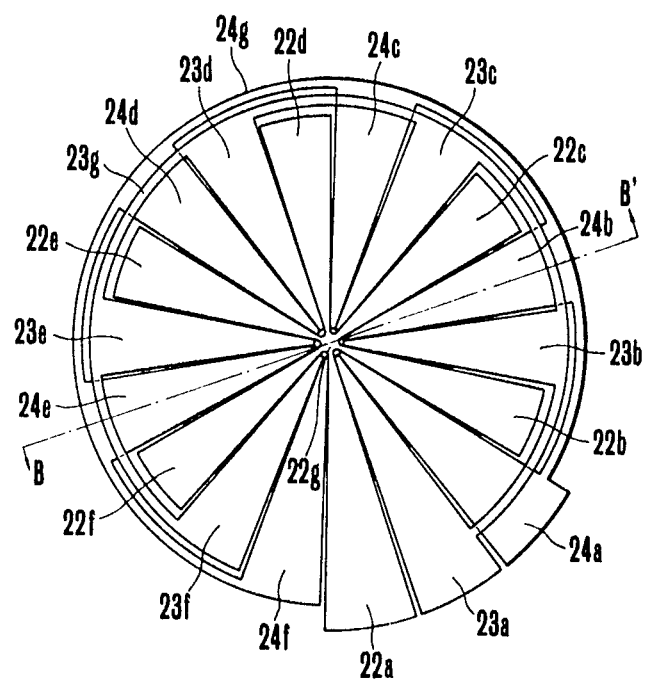
FIG. 2(*a*) is a plan view of an example of the construction and arrangement of a set of electrodes on a second transparent plate of the solid-state diaphragm device.

In FIG. 2(a) there is shown a second set of transparent electrodes formed 22a-22f on the other transparent plate 30 of the solid-state diaphragm device shown in FIG. 1(a). Said second set of mutually insulated electrodes are 18 in number, and are configured to radially extending sectoral shapes. These electrodes are divided into three groups of six, and the six electrodes in each group are electrically connected to one another.

The sectoral electrodes 22a-22f constitute one group and all are electrically connected to an electrode 22g at the center of the area to receive power and energy.

The sectoral electrodes 23a-23f also constitute one group and all are electrically connected to an electrode 23g provided at the outer periphery of these electrodes 23a-23f to receive energy.

The sectoral electrodes 24a-24f also constitute one group and are all connected to an electrode 24g provided at the outer periphery of these electrodes 24a-24f to receive power and energy.

Figure 2B:
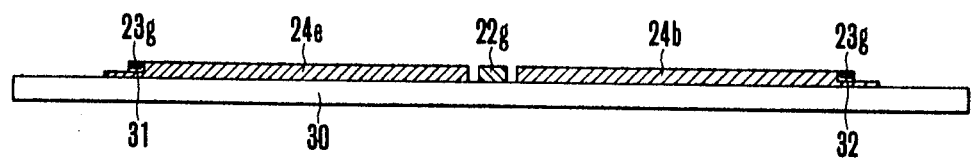

FIG. 2(b) shows a sectional view taken along line B—B' of FIG. 2(a). This view includes a transparent plate 30 of the solid-state diaphragm device; electrically insulating transparent layer strips 31 and 32 that serve to prevent the sectoral electrodes 24b and 24e from electrically contacting the arcuate electrode 23g. Because the sectoral electrodes 24b, 24e and so on are radially arranged, the space which the insulating layer occupies is very small. A layer of liquid crystal material is sandwiched between the transparent plates 20 and 30. If the liquid crystal material is of the FETN type, the liquid crystal cell is positioned in a space between an analizer and a polarizer, so that when a higher potential is applied between the transparent electrodes, the nematic structure of the liquid crystal material is caused to untwist. Under this circumstance, the polarizer will block the light in the areas across which the potential exists, thus opening or closing the diaphragm aperture.

Figure 3A:
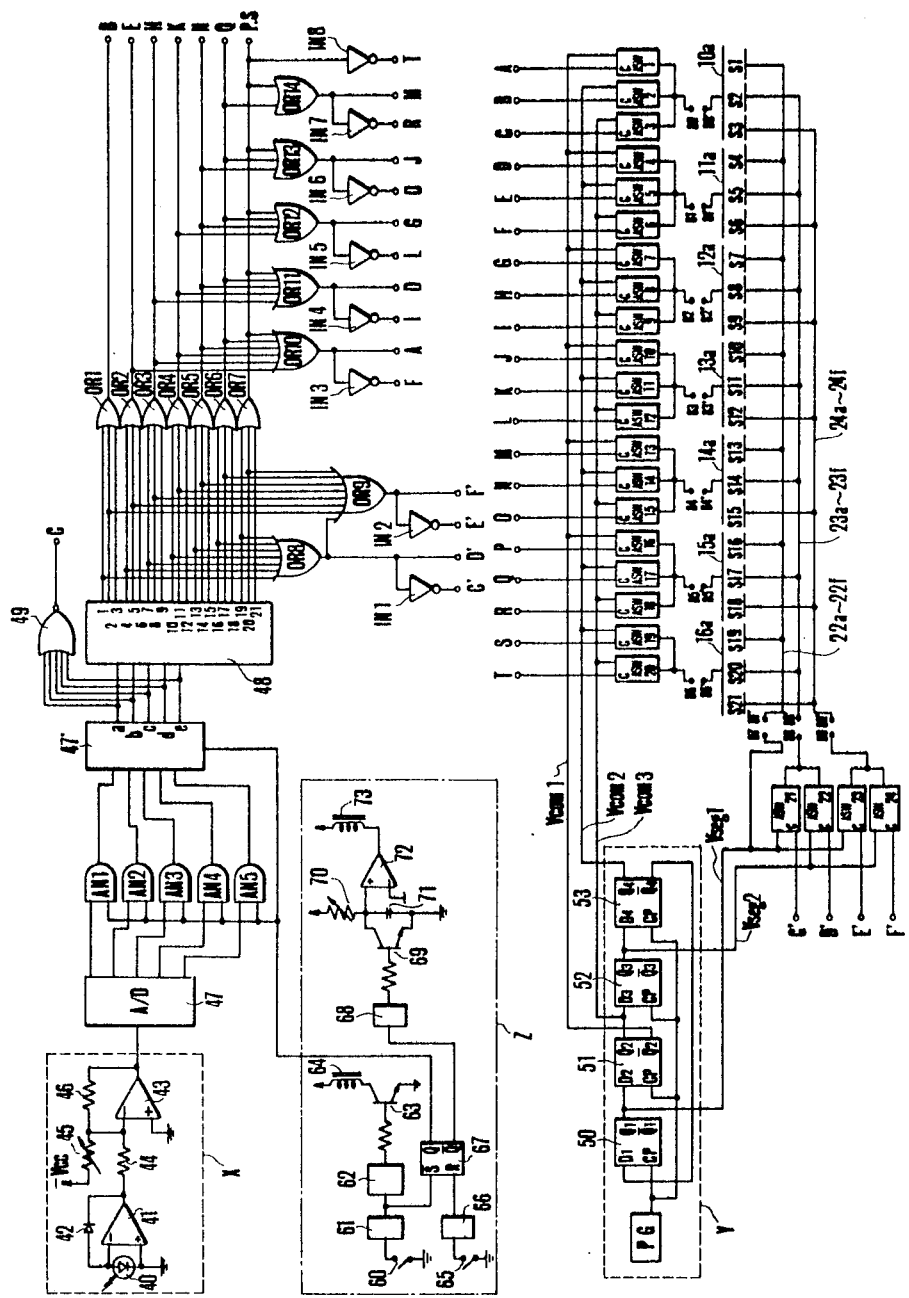
FIG. 3(*a*) is an electrical circuit diagram, partly in block form, of one embodiment of the solid-state diaphragm device using the liquid crystal cell of FIGS. 1 and 2 according to the present invention.

A drive circuit for the solid-state diaphragm device of such construction according to the invention is shown in FIG. 3(a). This circuit is assumed to be adapted for use with a shutter priority automatic exposure control apparatus in a single lens reflex camera.

In FIG. 3(a), a light measuring and computing circuit; X includes a photovoltaic cell (SPC) 40 for measuring a light value at full open aperture; and an operational amplifier forming a SPC head amplifier having two input terminals across which the SPC is connected. The negative feedback network of the operational amplifier 41 includes a diode 42 for logarithmic compression. An operational amplifier 43 forms an adding circuit its non-inverting input grounded and its inverting input connected through a resistor 44 to the output of the operational amplifier 41 and through a variable resistor 45 to the negative terminal of a battery, -Vcc. The resistor 45 has set therein preset shutter speed information and ASA sensitivity information of the film used. The operational amplifier 43 includes a feedback resistor 46 and produces an output in the form of an analogue voltage representing a number of aperture stops to be closed down from the full open aperture, or ΔAv.

An A/D converter serves for converting an analogue input signal into a 5-bit binary coded signal. Two-input AND gates AN1 to AN5 one of their inputs connected to the respective output bits of the A/D converter 47, and the other inputs all connected to the Q output of a RS flip-flop circuit 67 in a shutter control circuit Z to be described later. A latch circuit 47' responds to the change of the Q output of the RS flip-flop circuit to high level for latching the 5-bit binary coded input signal. A decoder 48 converts the binary coded input signal to a decimal code. A 5-input NOR gate 49 has inputs all connected to the respective output stages of the latch circuit 47'. Three inputs in each OR gate OR1 to OR7 are connected to the outputs 1-3, 4-6, 7-9, 10-12, 13-15, 16-18 and 19-21 respectively of the decoder 48.

A 7-input OR gate OR8 has its inputs connected to the respective outputs 1, 4, 7, 10, 13, 16 and 19 of the decoder 48. An 8-input OR gate OR9 has its inputs connected to the respective outputs 2, 5, 8, 11, 14, 17 and 20 of the decoder 48 and the output of the OR gate OR8. OR10 is a 6-input OR gate with its inputs connected to the respective outputs of the OR gates OR2-OR7. OR11 is a 5-input OR gate with its inputs connected to the respective outputs of the OR gates OR3-OR7. OR12 is a 4-input OR gate with its inputs connected to the respective outputs of the OR gates OR4-OR7. OR13 is a 3-input OR gate with its inputs connected to the respective outputs of the OR gates OR6-OR7. OR14 is a 2-input OR gate with its inputs connected to the respective outputs of the OR gates OR6-OR7. IN1-IN8 are inverters having inputs connected to the respective outputs of the OR gates OR8-OR14 and OR7.

Now letting C denote the output of NOR gate 49, B, E, H, K, N, Q and P-S the outputs of OR gates OR1 to OR7 respectively, D', F', A, D, G, J and M the outputs of OR gates OR8-OR14, and C', E', F, I, L, O, R and T the outputs of the inverters IN1 to IN8 respectively, a truth value table relating the 5-bit outputs, a, b, c, d and e of the A/D converter 47 with the outputs A to T and C' to F' follows:

| a | b | c | d | e | A | B | C | D | E | F | G | H | I | J | K | L | M | N | O | P | Q | R | S | T | C' | D' | E' | F' |
|---|---|---|---|---|---|---|---|---|---|---|---|---|---|---|---|---|---|---|---|---|---|---|---|---|----|----|----|----|
| 0 | 0 | 0 | 0 | 0 | 0 | 1 | 0 | 0 | 1 | 0 | 0 | 1 | 0 | 0 | 1 | 0 | 0 | 1 | 0 | 0 | 1 | 0 | 1 | 1 | 0  | 1  | 0  |
| 1 | 0 | 0 | 0 | 0 | 1 | 0 | 0 | 0 | 1 | 0 | 0 | 1 | 0 | 0 | 1 | 0 | 0 | 1 | 0 | 0 | 1 | 0 | 1 | 0 | 1  | 0  | 1  |
| 0 | 1 | 0 | 0 | 0 | 1 | 0 | 0 | 0 | 1 | 0 | 0 | 1 | 0 | 0 | 1 | 0 | 0 | 1 | 0 | 0 | 1 | 0 | 1 | 1 | 0  | 0  | 1  |
| 1 | 1 | 0 | 0 | 0 | 1 | 0 | 0 | 0 | 1 | 0 | 0 | 1 | 0 | 0 | 1 | 0 | 0 | 1 | 0 | 0 | 1 | 0 | 1 | 1 | 0  | 1  | 0  |
| 0 | 0 | 1 | 0 | 0 | 1 | 0 | 0 | 0 | 1 | 0 | 0 | 0 | 1 | 0 | 0 | 1 | 0 | 0 | 1 | 0 | 1 | 0 | 1 | 0 | 1  | 0  | 1  |

-continued

| a | b | c | d | e | A | B | C | D | E | F | G | H | I | J | K | L | M | N | O | P | Q | R | S | T | C' | D' | E' | F' |
|---|---|---|---|---|---|---|---|---|---|---|---|---|---|---|---|---|---|---|---|---|---|---|---|---|---|---|---|---|
| 1 | 0 | 1 | 0 | 0 | 1 | 0 | 0 | 0 | 1 | 0 | 0 | 0 | 1 | 0 | 0 | 1 | 0 | 0 | 1 | 0 | 0 | 1 | 0 | 1 | 1 | 0 | 0 | 1 |
| 0 | 1 | 1 | 0 | 0 | 1 | 0 | 0 | 0 | 1 | 0 | 0 | 0 | 1 | 0 | 0 | 1 | 0 | 0 | 1 | 0 | 0 | 1 | 0 | 1 | 1 | 0 | 1 | 0 |
| 1 | 1 | 1 | 0 | 0 | 1 | 0 | 0 | 1 | 0 | 0 | 0 | 1 | 0 | 0 | 0 | 1 | 0 | 0 | 1 | 0 | 0 | 1 | 0 | 1 | 0 | 1 | 0 | 1 |
| 0 | 0 | 0 | 1 | 0 | 1 | 0 | 0 | 1 | 0 | 0 | 0 | 1 | 0 | 0 | 0 | 1 | 0 | 0 | 1 | 0 | 0 | 1 | 0 | 1 | 1 | 0 | 0 | 1 |
| 1 | 0 | 0 | 1 | 0 | 1 | 0 | 0 | 1 | 0 | 0 | 0 | 1 | 0 | 0 | 0 | 1 | 0 | 0 | 1 | 0 | 0 | 1 | 0 | 1 | 1 | 0 | 1 | 0 |
| 0 | 1 | 0 | 1 | 0 | 1 | 0 | 0 | 1 | 0 | 0 | 1 | 0 | 0 | 0 | 1 | 0 | 0 | 0 | 1 | 0 | 0 | 1 | 0 | 1 | 1 | 0 | 1 | 0 |
| 1 | 1 | 0 | 1 | 0 | 1 | 0 | 0 | 1 | 0 | 0 | 1 | 0 | 0 | 0 | 1 | 0 | 0 | 0 | 1 | 0 | 0 | 1 | 0 | 1 | 1 | 0 | 0 | 1 |
| 0 | 0 | 1 | 1 | 0 | 1 | 0 | 0 | 1 | 0 | 0 | 1 | 0 | 0 | 0 | 1 | 0 | 0 | 0 | 1 | 0 | 0 | 1 | 0 | 1 | 1 | 0 | 1 | 0 |
| 1 | 0 | 1 | 1 | 0 | 1 | 0 | 0 | 1 | 0 | 0 | 1 | 0 | 0 | 1 | 0 | 0 | 0 | 1 | 0 | 0 | 0 | 1 | 0 | 1 | 0 | 1 | 0 | 1 |
| 0 | 1 | 1 | 1 | 0 | 1 | 0 | 0 | 1 | 0 | 0 | 1 | 0 | 0 | 1 | 0 | 0 | 0 | 1 | 0 | 0 | 0 | 1 | 0 | 1 | 1 | 0 | 0 | 1 |
| 1 | 1 | 1 | 1 | 0 | 1 | 0 | 0 | 1 | 0 | 0 | 1 | 0 | 0 | 1 | 0 | 0 | 0 | 1 | 0 | 0 | 0 | 1 | 0 | 1 | 1 | 0 | 1 | 0 |
| 0 | 0 | 0 | 0 | 1 | 1 | 0 | 0 | 1 | 0 | 0 | 1 | 0 | 0 | 1 | 0 | 0 | 1 | 0 | 0 | 0 | 1 | 0 | 0 | 1 | 0 | 1 | 0 | 1 |
| 1 | 0 | 0 | 0 | 1 | 1 | 0 | 0 | 1 | 0 | 0 | 1 | 0 | 0 | 1 | 0 | 0 | 1 | 0 | 0 | 0 | 1 | 0 | 0 | 1 | 0 | 1 | 0 | 1 |
| 0 | 1 | 0 | 0 | 1 | 1 | 0 | 0 | 1 | 0 | 0 | 1 | 0 | 0 | 1 | 0 | 0 | 1 | 0 | 0 | 0 | 1 | 0 | 0 | 1 | 1 | 0 | 0 | 1 |
| 1 | 1 | 0 | 0 | 1 | 1 | 0 | 0 | 1 | 0 | 0 | 1 | 0 | 0 | 1 | 0 | 0 | 1 | 0 | 0 | 1 | 0 | 0 | 1 | 0 | 0 | 1 | 0 |
| 0 | 0 | 1 | 0 | 1 | 1 | 0 | 0 | 1 | 0 | 0 | 1 | 0 | 0 | 1 | 0 | 0 | 1 | 0 | 0 | 1 | 0 | 0 | 1 | 0 | 1 | 0 | 0 | 1 |
| 1 | 0 | 1 | 0 | 1 | 1 | 0 | 0 | 1 | 0 | 0 | 1 | 0 | 0 | 1 | 0 | 0 | 1 | 0 | 0 | 1 | 0 | 0 | 1 | 0 | 1 | 0 | 1 | 0 |

The circuit of FIG. 3(a) further includes a pulse generating circuit portion Y for producing four pulse voltages with their phases separated by ⅛ period from each other. A pulse generator PG, and D-flip-flop circuits 50-53 with their clock inputs connected to the output of the pulse generator PG. The Q outputs of the D-flip-flop circuits 51, 52 and 53, Q1, Q2 and Q3, are connected to the respective next stage D-flip-flop circuits 51, 52 and 53 at their D inputs D2, D3 and D4. The Q output Q4 of the D-flip-flop circuit 53 is connected to the D input D1 of the D-flip-flop circuit 50. The clock pulse train from the pulse generator PG, and the waveforms of the output pulses from the output stages Q1, Q2, $\overline{Q2}$, Q3 and Q4 of the D-flip-flop circuits are shown in FIG. 3(b). The output waveforms of the outputs Q2, $\overline{Q2}$ and Q4 are denoted by $V_{COM3}$, $V_{COM1}$ and $V_{COM2}$ respectively, and the output waveforms of the outputs Q1 and Q3 are denoted by Vseg1 and Vseg2 respectively.

Analogue switches ASW1, ASW4, ASW7, ASW10, ASW13 and ASW16 receive the above-described pulse waveform $V_{COM1}$, analogue switches ASW2, ASW5, ASW8, ASW11, ASW14, ASW17 and ASW19 receive the pulse waveform $V_{COM2}$, and analogue switches ASW3, ASW6, ASW9, ASW12, ASW15, ASW18 and ASW20 receive the pulse waveform $V_{COM3}$. The control inputs of the said analogue switches ASW1 to ASW20 are connected to the outputs A to T respectively. The analogue switches ASW1-ASW3 have outputs all connected to the annular transparent electrode 10a; the analogue switches ASW4-ASW6 have outputs all connected to the annular transparent electrode 11a; the analogue switches ASW7-ASW9 have outputs all connected to the annular transparent electrode 12a; the analogue switches ASW10-ASW12 have outputs all connected to the transparent electrode 13a; the analogue switches ASW13-ASW15 have outputs all connected to the transparent electrode 14a; the analogue switches ASW16-ASW18 have outputs all connected to the transparent electrode 15a; and the analogue switches ASW19 and ASW20 have outputs all connected to the transparent electrode 16a.

Of a group of analogue switches ASW21-ASW24, the analogue switches ASW21 and ASW23 receive the pulse waveform Vseg1, the analogue switches ASW22 and ASW24 receive the pulse waveform Vseg2. The control inputs of said analogue switches ASW21-ASW24 are connected to the outputs C'-F' respectively. The analogue switches ASW21 and ASW22 have outputs connected to the sectoral electrodes 23a-23f of the solid-state diaphragm device, and the analogue switches ASW23 and ASW24 have outputs connected to the sectoral electrodes 24a-24f of the solid-state diaphragm device. Further, the sectoral electrodes 22a-22f of the solid-state diaphragm device are fed with the pulse waveform Vseg1.

FIG. 3(c) shows the voltage waveforms obtained by subtracting the pulse waveforms Vseg1 and Vseg2 from the pulse waveforms $V_{COM1}$-$V_{COM3}$. As is evident from this figure, the effective values of the upper three pulse waveforms are made larger than those of the lower three pulse waveforms. If the threshold voltage Vth of the liquid crystal lies between the above-described two effective values, those of the areas of the liquid crystal layer at which the value $V_{COM1}$ exists go ON regardless of whether the waveform applied on the opposite electrode is Vseg1 or Vseg2. Those of the areas of the liquid crystal layer at which the value $V_{COM2}$ exists go ON when the waveform applied on the opposite electrode is Vseg1, and OFF when it is Vseg2. Those of the areas of the liquid crystal layer at which the $V_{COM3}$ exists always go OFF regardless of whether the waveform applied on the opposite electrode is Vseg1 or Vseg2.

In a shutter control circuit Z, a switch 60 closes when a shutter release button (not shown) is actuated. A differentiation circuit responds to the closure of the switch 60 for producing a negative differentiation pulse. A one-shot multi-vibrator responds to the above-described negative differentiation pulse for producing one pulse as it is triggered. A switching transistor has its base connected through a resistor to the output of the one-shot 62 and its collector connected to an electromagnet 64 for first releasing a latch.

A switch 65 closes when the trailing curtain of a shutter (assumed to be a focal plane shutter) has completed its run down movement. A differentiation circuit responds to the closure of the switch 65 for producing a negative differentiation pulse. An RS flip-flop circuit 67 having set and reset inputs connected to the outputs of the differentiation circuits 61 and 66 respectively, has an output $\overline{Q}$ connected to the input of a delay circuit 68.

The output Q of the flip-flop circuit 67 is connected to the AND gates AN1-AN5 at the other inputs thereof and to the latch input of the latch circuit 47'. A switching transistor 69 with its base connected through a resistor to the output of the delay circuit 68 starts the timing. A variable resistor 70 has a resistance value related to the preset shutter speed information. A timing condenser or capacitor 71 is connected in parallel to the switching transistor 69. An operational amplifier 72 forms a comparator with its non-inverting input terminal connected to a junction point of the variable resistor 70 and capacitor 71 and with its inverting input terminal fed with a reference voltage Vf. A shutter trailing curtain control electromagnet 73 is connected to the output of the OP amplifier 72.

The operation of the circuit in FIG. 3(a); is as follows. Before the shutter is actuated to operate, the output Q of the RS flip-flop circuit 67 in the shutter control circuit Z is of L level (low or "0") so that the AND gate AN1-AN5 are closed with their outputs all being low. Therefore, the 5-bit outputs [abcde] of the latch circuit 47' are all of L level. In this condition, as is evident from the truth table, the outputs C, F, I, L, O, R, T, C' and E' are of high level (high or "1"), while the others are low. Therefore, the analogue switches ASW3, ASW6, ASW9, ASW12, ASW15, ASW18 and ASW20 are turned on to apply the pulse waveform $V_{COM3}$ to all the annular transparent electrodes 10a to 16a of the solid-state diaphragm device. As stated above, regardless of whether the pulse waveforms Vseg1 or Vseg2 is applied to the opposite electrodes, all the areas S1 to S21 of the liquid crystal layer are turned off, thus transmitting light over the entire area of the solid state diaphragm device.

When a shutter release button (not shown) is depressed, the switch 60 is closed and the next stage differentiation circuit 61 produces a negative differentiation pulse which triggers the one shot multi-vibrator 62 to produce one pulse at the output thereof. During a period equal to the width of this pulse, the switching transistor 63 is turned on to energize the coil 64. Then, the shutter is released from its connection with the first latching means, and termination of the upward movement of the quick return mirror is followed by the start of run down movement of the leading curtain of the shutter, thus initiating an exposure.

The negative differentiation pulse from the differentiation circuit 61 also serves to set the RS flip-flop 67 and its $\overline{Q}$ and Q outputs to low and high levels respectively. After a time interval from this moment of change, the delay circuit 68 changes its output to low, causing the switching transistor 69 to turn off. From this time onward, the timing capacitor 71 is charged through the variable resistor 70 having a resistance value corresponding to the preselected shutter speed. When the voltage on the timing capacitor 71 has reached a predetermined level, the output of the operational amplifier 72 forming the comparator is changed to a high and the duration of energization of the magnetic winding 73 controlling the operation of the trailing curtain of the shutter is terminated, causing the trailing curtain to run down. When the trailing curtain reaches the end of its movement, the switch 65 is closed. Responsive this closure, the differentiation circuit 66 produces a negative pulse which is applied to set the RS flip-flop circuit 67 with its Q output changed to low level and $\overline{Q}$ output to high level.

During the time the operation of the shutter proceeds, the Q output of the RS flip-flop circuit 67 is held high. While this Q output is high, the AND gates AN-1-AN5 are open, so that the 5-bit binary coded output signal from the A/D converter 47 enters the latch circuit 47' and after having once been latched here will go out.

Now suppose the analogue output voltage (ΔAv information) of the operational amplifier 43 in the light measuring and computing circuit X is converted to [00100] and only the output 4 of the decoder 48 is high.

In this case, as is evident from the truth table, the outputs A, E, I, L, O, R, T, D' and F' are high, while the others are of low level.

Therefore, the analogue switches ASW1, ASW5, ASW9, ASW12, ASW15, ASW18, ASW20, ASW22 and ASW24 are turned on, while the other analogue switches remain off. In this condition, the annular transparent electrode 10a of the solid-state diaphragm device is fed with the pulse waveform $V_{COM1}$, the annular transparent electrode 11a with the pulse waveform $V_{COM2}$ and the other transparent annular electrodes 12a to 16a with the pulse waveform $V_{COM3}$. On the other hand, the sectoral electrodes 22a-22f of the solid-state diaphragm device are fed with the pulse waveform Vseg1, the sectoral electrodes 23a-23f with the pulse waveform Vseg2 and the sectoral electrodes 24a-24f with the pulse waveform Vseg2.

Figure 4:
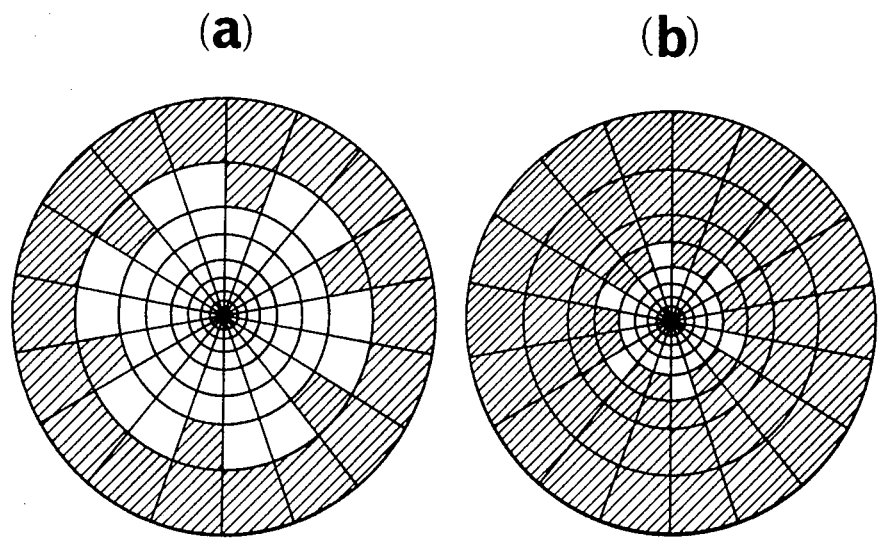
FIGS. 4(*a*) and 4(*b*) are plan views of two different patterns of light transmitting areas surrounded by the opaque areas in the liquid crystal cell of FIGS. 1 and 2 when the diaphragm is closed down.

Therefore, in this condition, as mentioned above, the first four of the areas of the liquid crystal layer, S1 to S4, are turned on by application of an alternating voltage whose effective value is higher than the threshold value of the liquid crystal, while the areas S5 to S21 are turned off by application of an alternating voltage whose effective value is below the threshold value of the liquid crystal. Thus, the diaphragm aperture is closed down to a position shown in FIG. 4(a). As is evident from the figure, the number of stops closed down from the full open aperture is adjusted by the matrix driving system to one and ⅓ stops.

As the object brightness is changed, the analogue output voltage (ΔAv information) of the operational amplifier 43 of the light measuring and computing circuit X is changed so that the output of the A/D converter becomes [11010].

In this case, as is evident from the truth table, the outputs A, D, G, K, O, R, T, C' and F' are of high level, while the others are of low level. Therefore, in this condition, the analogue switches ASW1, ASW4, ASW7, ASW11, ASW15, ASW18, ASW20, ASW21 and ASW24 are turned on, while the other analogue switches are turned off. In this condition, the annular transparent electrodes 10a to 12a of the solid-state diaphragm device are fed with the pulse waveform $V_{COM1}$, the annular transparent electrode 13a with the pulse waveform $V_{COM2}$ and the annular transparent electrodes 14a to 16a with the pulse waveform $V_{COM3}$. On the other hand, the sectoral electrodes 22a-22f of the solid-state diaphragm device are always fed with the pulse waveform Vseg1, the sectoral electrodes 23a-23f with the pulse waveform Vseg1 and the sectoral electrodes 24a-24f with the pulse waveform Vseg2.

Therefore, in this condition, as has been mentioned above, the areas S1 to S11 of the liquid crystal layer are turned on by application of an alternating voltage whose effective value is above the threshold value of the liquid crystal, and the areas S12 to S21 are turned off by application of an alternating current voltage whose effective value is below the threshold value of the liquid crystal. Thus, the diaphragm aperture is closed down from the full open to a position shown in FIG. 4(b). As is evident from the figure, the number of stops closed down is 3(⅔) stops.

Turning again to FIG. 3(a), 80-89 and 80'-89' are interconnection terminals provided on the lens mounting and the camera housing respectively. These terminals are essential members when the above-described solid-state diaphragm device is provided in the interchangeable lens mounting.

Figure 5:
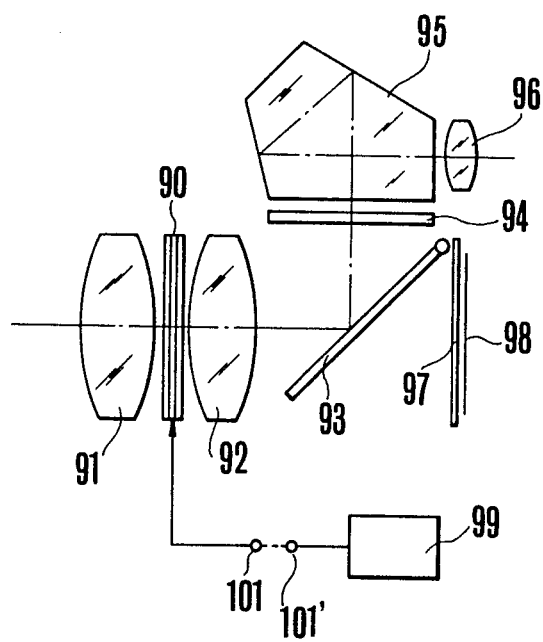
FIG. 5 is a schematic sectional view of a single lens reflex camera employing the solid-state diaphragm device of the invention.

FIG. 5 shows an arrangement of the solid-state diaphragm device within the single lens reflex camera. In the figure, 90 is the solid-state diaphragm device using the liquid crystal cell. When the liquid crystal is of FETN type, the cell is positioned between an analizer and a polarizer. The figure shows a photo-taking lens 91 and 92; a quick return reflex mirror 93; a focusing screen 94; a penta prism 95; an eye-piece 96; a focal plane shutter 97; a film 98; and the above-described drive circuit 99 for the solid-state diaphragm device. Interconnection terminals 101 on the interchangeable lens mounting and the camera housing respectively establish electrical connection between the solid-state diaphragm device 90 and the drive circuit 99.

The foregoing embodiment has been described inconnection with the ½ step precision of aperture control. For an increase in the precision to ⅓ or more, the number of transparent sectoral electrodes shown in FIG. 2(a) has to be increased with increase in the number of groups. If the number of groups is n, the diaphragm can be controlled with 1/n step precision.

In the foregoing embodiment, the diaphragm is closed down from the marginal portion. But the present invention is not confined thereto. In the case of the solid-state diaphragm device, it is also possible to close down from the center, or a desired portion with ease.

The foregoing detailed description has been about the solid-state diaphragm device having the electrode pattern shown in FIG. 2. In this connection it should be pointed out that all of the plurality of sectoral electrodes are configured to the same area so that each step is variable by the ½ area. Therefore, such a pattern does not make it possible to control the diaphragm aperture with the precision of exactly ½ unit in each stop. In other words, though the amount of light passing through the diaphragm is varied by ½ unit, as the diaphragm stop is expressed by the multiple series of two, the precision of diaphragm control does not progress exactly ½ stop.

Figure 6:
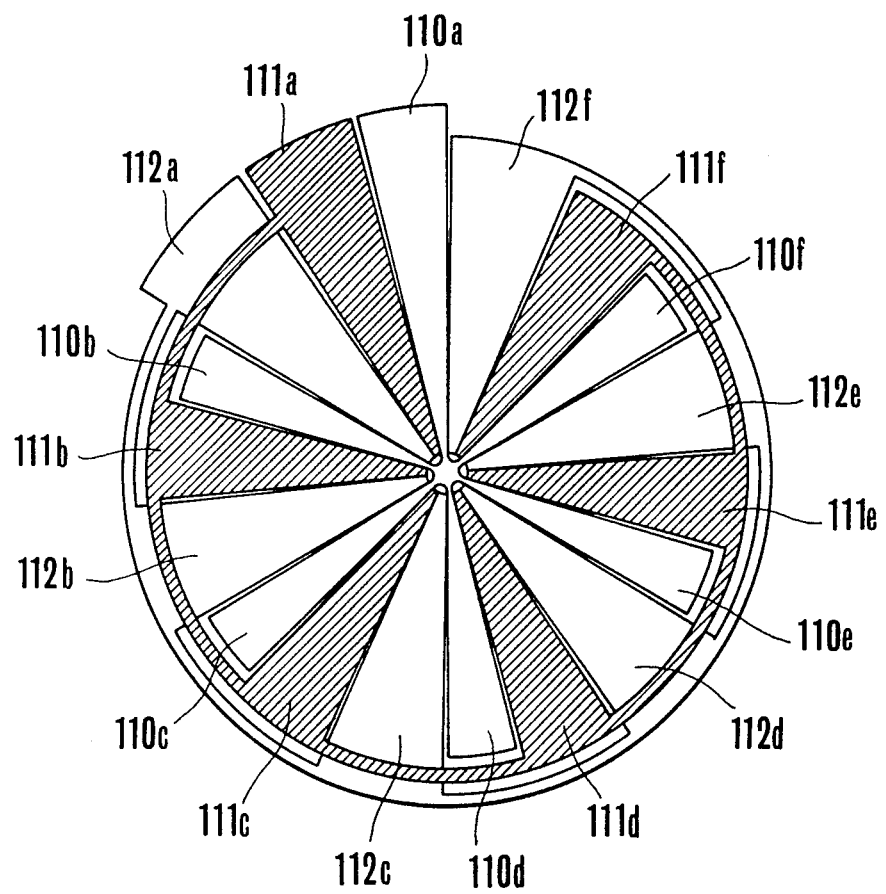
FIG. 6 is a plan view of another example of construction and arrangement of a set of electrode on the above-described second transparent plate.

In order to control the diaphragm aperture in exactly ½ steps, instead of the sectoral pattern of FIG. 2(a), use is made of a plurality of sectoral electrodes such as those shown in FIG. 6 in a pattern of such electrode areas that the amount of light from the object past the diaphragm is controlled in the multiple series of two. That is, in FIG. 6, when intermediate steps of ½ unit in APEX system are incremented, a first plurality of sectoral electrodes 110a–110f are turned on. When intermediate steps of ⅔ units in APEX system are to be incremented, first and second sets of sectoral transparent electrodes 110a–110f and 111a to 111f are simultaneously turned on. When intermediate steps of smaller unit or units, for example, ¼ unit is to be incremented, the correspondingly increased number of transparent electrodes are employed and arranged in such relation of their areas as described above.

As has been described in detail, the present invention furnishes a liquid crystal light shutter type solid-state diaphragm device with the transparent electrodes arranged matrix-wise on the upper and lower transparent plates. Even when the number of steps in each aperture stop is increased, it is possible to reduce the necessary number of power source lines from external drive circuit and obtain many advantages in the manufacturing of the solid-state diaphragm device.

Because the insulating layer for electrically insulating the power source lines from the transparent electrodes is of very small area, and the application only to a portion of the outer periphery of the sectoral electrode is sufficient, the structure is simplified, and the manufacturing becomes very easy.

Though the above-described embodiment requires the insulating layer strips 31 and 32 because the size of diaphragm aperture of the camera is controlled with a precision of ½ step in the APEX system, when the precision of aperture control is limited to ½ step, these insulating layer strips are no longer necessary.

What is claimed is:

1. In a solid state diaphragm device for use in a photographic camera having an electro-optical element and a matrix drive system for controlling the selection of light transmitting areas of said electro-optical element to vary the size of the diaphragm aperture, the improvement comprising:
   first and second transparent plates sandwiching said electro-optical element;
   a first set of transparent annular electrodes positioned on said first transparent plate and arranged in concentric relation to each other, and
   a second set of transparent electrodes positioned on said second transparent plate and arranged in radial relation to each other;
   said first set of electrodes and said second set of electrodes having matrix crossover areas each defined by one of said first electrodes and one of said second electrodes, each of said crossover areas in one concentric group when energized by one of said first set of electrodes and one of said second set of electrodes being of a size to vary light transmittance by the same fraction of a unit in the APEX system.

2. In a solid state diaphragm device for use in a photographic camera having an electro-optical element and a matrix drive system for controlling the selection of light transmitting areas of said electro-optical element to vary the size of the diaphragm aperture, the improvement comprising:
   first and second transparent plates sandwiching said electro-optical element;
   a first set of transparent annular electrodes positioned on said first transparent plate and arranged in concentric relation to each other, and
   a second set of transparent electrodes positioned on said second transparent plate and arranged in radial relation to each other and having respective areas, each area of second set of transparent electrodes being set in such a manner that the amount of light passing the diaphragm aperture vary in accordance with the variation of an intermediate step in APEX system.

\* \* \* \* \*